(12) United States Patent
Lorain et al.

(10) Patent No.: US 9,873,095 B2
(45) Date of Patent: Jan. 23, 2018

(54) COPOLYMER HAVING AMPHIPHILIC BLOCKS, AND USE THEREOF FOR MANUFACTURING POLYMER FILTRATION MEMBRANES

(71) Applicants: POLYMEM, Castanet-Tolosan (FR); ARKEMA FRANCE, Colombes (FR); CENTRE NATIONAL DE LA RECHERCHE SCIENTIFIQUE, Paris (FR); UNIVERSITE PAUL SABATIER TOULOUSE, Toulouse (FR)

(72) Inventors: Olivier Lorain, Portet sur Garonnne (FR); Jean-Michel Espenan, Deyme (FR); Jean-Christophe Remigy, Goyrans (FR); Jean-Francois Lahitte, Vallesvilles (FR); Jean-Christophe Rouch, Montbrun Lauragais (FR); Thibaut Savart, Lacanau-de-Mios (FR); Pierre Gerard, Denguin (FR); Stephanie Magnet, Morlanne (FR)

(73) Assignees: POLYMEM, Castanet-Tolosan (FR); ARKEMA FRANCE, Colombes (FR); CENTRE NATIONAL DE LA RECHERCHE SCIENTIFIQUE, Paris (FR); UNIVERSITE PAUL SABATIER TOULOUSE III, Toulouse (FR)

( * ) Notice: Subject to any disclaimer, the term of this patent is extended or adjusted under 35 U.S.C. 154(b) by 369 days.

(21) Appl. No.: 14/775,239

(22) PCT Filed: Mar. 11, 2014

(86) PCT No.: PCT/EP2014/054630
§ 371 (c)(1),
(2) Date: Sep. 11, 2015

(87) PCT Pub. No.: WO2014/139977
PCT Pub. Date: Sep. 18, 2014

(65) Prior Publication Data
US 2016/0030896 A1    Feb. 4, 2016

(30) Foreign Application Priority Data

Mar. 13, 2013   (FR) .................................... 13 52218

(51) Int. Cl.
*C08F 220/14*   (2006.01)
*C08F 220/18*   (2006.01)
(Continued)

(52) U.S. Cl.
CPC .......... *B01D 71/80* (2013.01); *B01D 67/0011* (2013.01); *B01D 71/34* (2013.01);
(Continued)

(58) Field of Classification Search
None
See application file for complete search history.

(56) References Cited

U.S. PATENT DOCUMENTS

| 5,190,989 A |  | 3/1993 | Himori |  |
| 2011/0207841 A1* | | 8/2011 | Kosar | .................... B01D 71/34 521/134 |

FOREIGN PATENT DOCUMENTS

WO   2010/051150 A   5/2010

OTHER PUBLICATIONS

Dynamic-Mechanical Behavior of Hydrophobic-Hydrophilic ICN. pdf—Dynamic-Mechanical Behavior of Hydrophobic-Hydrophilic Interpenetrating Copolymer Networks, Polymer Engineering and Science—Gomes, D. et al (Year: 2006).*

(Continued)

*Primary Examiner* — Krishnan S Menon
*Assistant Examiner* — Bradley R Spies
(74) *Attorney, Agent, or Firm* — Young & Thompson

(57) ABSTRACT

A copolymer having amphiphilic blocks includes at least one first hydrophilic block, obtainable from n-butyl acrylate and hydroxyethyl methacrylate monomers, and a second hydrophobic block likely to be obtained from a methyl methacrylate monomer. The copolymer is found to be particularly (Continued)

advantageous for use as an additive for manufacturing a polymer filtration membrane, particularly a PVDF membrane, particularly via a phase inversion method.

22 Claims, 2 Drawing Sheets

(51) Int. Cl.
    *C08F 220/20*    (2006.01)
    *C08L 53/00*    (2006.01)
    *B01D 71/80*    (2006.01)
    *B01D 71/34*    (2006.01)
    *C08F 293/00*    (2006.01)
    *B01D 67/00*    (2006.01)
    *C02F 1/44*    (2006.01)
    *C08L 27/16*    (2006.01)
    *B01D 61/00*    (2006.01)
    *B01D 69/00*    (2006.01)
    *B01D 71/06*    (2006.01)
    *B01D 71/40*    (2006.01)

(52) U.S. Cl.
    CPC .............. *C02F 1/44* (2013.01); *C08F 293/00* (2013.01); *C08F 293/005* (2013.01); *C08L 53/00* (2013.01); *B01D 71/40* (2013.01); *C08F 2438/02* (2013.01)

(56) References Cited

OTHER PUBLICATIONS

Hydrophilic copolymers of 2-hydroxyethyl methacrylate with n-butyl acrylate.pdf—Mechanical properties of hydrophilic copolymers of 2-hydroxyethyl methacrylate—Journal of Biomedical Materials Research—Kolarik, Jan et al (Year: 1983).*
International Search Report dated Apr. 22, 2014, in corresponding PCT application.

* cited by examiner

COPOLYMER HAVING AMPHIPHILIC BLOCKS, AND USE THEREOF FOR MANUFACTURING POLYMER FILTRATION MEMBRANES

The present invention relates to an amphiphilic block copolymer which is particularly suitable for the manufacture of polymer filtration membranes, in particular polymer microfiltration or ultrafiltration membranes, intended for the treatment of effluents, and also to such a membrane including this copolymer.

Microfiltration (MF) and ultrafiltration (UF) membranes are frequently used to carry out the purification of effluents, in particular water for the production of drinking water, or the treatment of sewage before it is discharged to the environment.

Polymer MF or UF membranes are generally manufactured by a "phase inversion" technique which consists in forming a solution of polymer and of additive(s), commonly known as collodion, in shaping this solution and, finally, in bringing about its coagulation by bringing into contact with a coagulation solution comprising a nonsolvent of the polymer. Subsequent to exchanges of material which take place between the collodion and the nonsolvent, a liquid/liquid phase separation takes place, resulting in the formation of a first phase rich in polymer, which forms the membrane, and a second phase poor in polymer, which forms the pores of the membrane. The liquid/liquid phase separation can also be triggered by a change in temperature.

The choice of the additives determines the structural properties and the performances of the membrane. They are in particular used as pore-forming agents and/or hydrophilizing/hydrophobizing agents and/or electrical conductors and/or mechanical reinforcements and/or structuring agents. In the case of semicrystalline polymers, such as polyvinylidene fluoride (PVDF), frequently employed in the manufacture of filtration membranes, the additives can in particular influence the formation of the crystallites which confer properties of mechanical strength and/or chemical resistance on the material constituting the membrane.

The performances desired for a filtration membrane are of three types: filtration performance, in particular from the viewpoint of the permeability and the selectivity; structural properties, conferring in particular more or less elevated properties of mechanical strength and chemical resistance on the membrane, as a function of the surface condition of the membrane; and resistance in operation, that is to say resistance to aging. This resistance is defined as the ability of a membrane to keep its filtration, surface and mechanical strength properties intact during the filtration of effluents to be treated but also on contact with chemical rinsing solutions, such as chlorinated solutions, systematically employed for the cleaning of the membranes between two filtration cycles. The choice of the additives makes it possible to adjust one or more of these types of properties of the membrane.

The proposal has been made, in the prior art, to use, as additives for the manufacture of membranes, copolymers which make it possible to combine, in themselves alone, the advantages of several additives, and more particularly, as described, for example, in the patent document WO-A-2010/051150, amphiphilic block copolymers. As a result of their particular structure, amphiphilic block copolymers adopt specific conformations in solution and in particular undergo micellization in solution. During the implementation of a phase inversion process for the manufacture of a polymer membrane, as a result of the presence of water in the coagulation bath, the hydrophilic chains of these copolymers are attracted towards the surface of the membrane, where they become segregated, then conferring specific anticlogging surface properties on the membranes.

The increase in the lifetime of polymer filtration membranes currently constitutes a major challenge. Membranes are marketed with recommendations relating to their use, in particular with regard to the maximum instantaneous concentration of free sodium hypochlorite (NaOCl), and the pH regions in filtration and in washing, recommended so as to increase their lifetime. These limits on the use of membranes are due not only to the resistance of their base material but also to that of the additives employed. Thus, it is, for example, known that polyvinylpyrrolidone (PVP), an additive widely used in the manufacture of polymer filtration membranes, in particular for providing them with surface hydrophilicity (Fontananova et al., 2006), is degraded by chlorinated solutions, which are widely used for the washing of membranes (Wienk et al., 1995; Qin et al., 2002; Rouaix et al., 2006). Membranes comprising PVP then lose their surface properties over time as a result of the decomposition of the PVP, and their lifetime is limited thereby. More particularly, contact of the membranes comprising PVP with a NaOCl solution brings about an increase in their permeability and a decrease in their selectivity, resulting from an increase in the size of the pores, and also a decrease in their mechanical strength (Arkhangelsky et al., 2007).

It has also been shown that additives of copolymer type could be destroyed by acidic chemical solutions (Hester et al., 1999). The surface condition of the membranes can be regenerated by carrying out an annealing operation on the membrane at 90° C. for 12 hours. Such an annealing operation is not, however, compatible with an industrial use of the membranes, it can be expensive and, in addition, it is not completely effective. Indeed it has in particular been observed that the resistance to the absorption of proteins (bovine serum albumin (BSA)) of membranes after a single acid treatment of 30 min is very markedly lower than that of new membranes. The surface regeneration by annealing of the membrane makes it possible to recover only in part the protective effect of the copolymer with regard to the absorption of BSA.

The prior art has provided various processes for increasing the resistance of polymer membranes to chemical solutions, by techniques for modifying after manufacture, such as covering, a chemical or physical treatment, or by grafting. However, none of these solutions proves to be satisfactory. There thus remains a need to significantly improve the lifetime of polymer microfiltration and ultrafiltration membranes.

The present inventors have now discovered, unexpectedly, that amphiphilic block copolymers with a specific composition make it possible to achieve this objective and more particularly make it possible, employed as additives in the manufacture of polymer filtration membranes, to manufacture such membranes having improved surface properties, in particular in terms of hydrophilicity, roughness, and the like, similar material transfer properties, such as permeability, selectivity, and the like, to those of the membranes obtained from the conventional additives of the prior art, including from other copolymers, while exhibiting a significantly extended lifetime. In particular, the overall chemical resistance of these membranes is very markedly greater than what is observed in the context of the use of conventional additives, such as PVP, and the durability of the surface modifications brought about by the additive is greatly enhanced. In addition, these advantageous results are observed whatever the geometry of the membranes, whether the latter are flat, spiral, tubular, hollow fibers, and the like.

Thus, according to a first aspect, the present invention relates to an amphiphilic block copolymer comprising at least a first hydrophilic block obtainable from n-butyl acrylate and hydroxyethyl methacrylate monomers and a second hydrophobic block obtainable from a methyl methacrylate monomer.

Monomers are understood to mean, in the present description, conventionally in itself, any monomer which can be polymerized or copolymerized by the radical route. The term monomer encompasses, of course, the mixtures of several monomers.

"Amphiphilic" used here means that at least one block of the copolymer is hydrophilic and at least one block is hydrophobic.

"Hydrophilic block" is understood here to mean that the block of the copolymer is soluble in water, dispersible in water or generally has the ability to absorb and/or release water. The hydrophilic block can be a random copolymer comprising at least said hydrophilic n-butyl acrylate and hydroxyethyl methacrylate monomers and, if appropriate, other hydrophilic monomers, or a random copolymer comprising at least said hydrophilic monomers and, if appropriate, one or more other hydrophilic monomers, with one or more hydrophobic monomers.

"Hydrophobic block" is understood here to mean that the block of the copolymer is nonsoluble or nondispersible in water. The hydrophobic block can be a hydrophobic homopolymer, a random copolymer comprising at least said methyl methacrylate monomer and one or more other hydrophobic monomers, or a random copolymer comprising at least said methyl methacrylate monomer and, if appropriate, one or more hydrophobic monomers, with one or more hydrophilic monomers.

In the specific field of application of the amphiphilic block copolymer according to the invention for the manufacture of polymer membranes, the hydrophobic block is advantageously chosen in order to be compatible with the polymer(s) forming the filtration membrane. The methyl methacrylate homopolymer is in particular compatible with the PVDF participating in the composition of many membranes.

As set out above, when it is employed as additive in the manufacture of polymer membranes, in particular polymer microfiltration or ultrafiltration membranes, the amphiphilic block copolymer corresponding to the above definition makes it advantageously possible to lastingly modify the surface properties of the membrane and to significantly extend its lifetime, while keeping intact its other properties, such as the filtration performance and the general structure, in comparison with the additives provided by the prior art. In particular, this amphiphilic block copolymer:

makes possible the production of membranes as effective, in terms of permeability and selectivity, of structure and of mechanical properties, as those not comprising copolymer;

makes it possible to bring about modifications of surface properties of the membranes, such as the disappearance of the conventional nodular or spherulitic structure observed for semicrystalline polymers, such as PVDF, to the benefit of a wire structure, or also such as an enriching in hydrophilic function of the surface of the membranes and of the pores, which brings about a decrease in the contact angle of water on the membrane in immersion in water;

makes it possible to significantly extend the lifetime of the membranes. In particular, it has been observed by the present inventors that all the surface properties of the membranes are retained after contact with a very high dose of free NaOCl, that is to say a dose greater than 750 000 ppm·h at pH 8; no variation in permeability or in mechanical tensile strength properties occurs after contact with a dose of 1 350 000 ppm·h at pH 8 of free NaOCl in simple contact; no variation in the amount of copolymer present at the surface of the membranes is detected, by Fourier transform infrared spectroscopy (FTIR), after simple contact with a dose of 750 000 ppm·h at pH 8 of free NaOCl, nor is any modification to the permeability, to the mechanical strength and to the amount of copolymer present at the surface of the membranes detected after continuous filtration of a solution comprising 1 000 ppm of chlorine and at pH 8 for 24 h. Thus, the maximum doses of chlorine which can be used for the cleaning of the membranes, without detrimentally affecting the performances of the latter, are multiplied by at least 7 with respect to the membranes of the prior art.

Entirely unexpectedly, it has in addition been discovered by the present inventors that the use of the amphiphilic block copolymer according to the invention as additive in the manufacture of a polymer membrane by a phase inversion process makes it possible to significantly accelerate the rate of coagulation of the collodion, comprising the polymer matrix and the additives, in the nonsolvent, in comparison with the additives provided by the prior art. In addition this acceleration in the rate of coagulation does not take place to the detriment of the performances of the membrane. The amphiphilic block copolymer according to the invention thus advantageously makes it possible to increase the rate of production of the membranes, in particular the spinning rates in the manufacture of hollow fibers, in particular for polymers which coagulate slowly, such as PVDF. Such an acceleration in the rate of coagulation also confers, on the membranes, a more uniform structure, defects such as macrovoids being limited in number and in size, which improves the resistance/strength properties of the membrane in comparison with conventional membranes not employing the amphiphilic block copolymer according to the invention.

The amphiphilic block copolymer according to the invention can comprise neutralizable monomers and, in some cases, these monomers can be pre-neutralized. "Neutralized" as used here means that the hydrophilic block of the amphiphilic copolymer is completely or partially in the salt form. The neutralization can occur at any point in the polymerization or during a post-polymerization process, such as comprising stages of formulation, mixing or manufacture of film, parts, articles or membranes.

The architecture of the amphiphilic block copolymer of the invention is preferably of diblock type, that is say comprising a hydrophilic block and a hydrophobic block. The proportion by weight of the hydrophilic block in the copolymer is then preferably between 10 and 70%, preferably between 20 and 60%, and the proportion by weight of the hydrophobic block is between 90 and 30%, preferably between 80 and 40%.

The copolymer can otherwise be of triblock type (hydrophobic block-hydrophilic block-hydrophobic block, in which the hydrophobic blocks are identical or different; or hydrophilic block-hydrophobic block-hydrophilic block, in which the hydrophilic blocks are identical or different) or consist of a unique combination of these structures of block type, such as, but not limited to, linear, star or grafted block copolymers.

Preferred amphiphilic block copolymers of the invention are of the type in which at least:

the first hydrophilic block is essentially composed of a random copolymer essentially comprising n-butyl acrylate and hydroxyethyl methacrylate monomers; preferably, the proportion by weight of n-butyl acrylate monomers in the first hydrophilic block is between 99 and 50%, preferably between 95 and 70%, and the proportion by weight of hydroxyethyl methacrylate monomers is between 1 and 50%, preferably between 5 and 30%; the first hydrophilic block preferably exhibits a number-average molecular weight Mn of between 5 and 200 kg/mol and a weight-average molecular weight of between 10 and 400 kg/mol; its polydispersity index is preferably between 1.5 and 5;

and/or the second hydrophobic block is composed of at least 50% of PMMA, the remainder being formed of a mixture of methacrylate or acrylate monomers, preferably of n-butyl acrylate and hydroxyethyl methacrylate monomers; preferably, the second hydrophobic block is essentially composed of polymethyl methacrylate.

An amphiphilic block copolymer which is particularly preferred in the context of the invention is a (poly(n-butyl acrylate)-co-poly(hydroxyethyl methacrylate)-b-hydrophobic block) diblock copolymer, where the hydrophobic block is composed of at least 50% of polymethyl methacrylate, the remainder being formed of a mixture of methacrylate or acrylate monomers, preferably of n-butyl acrylate and hydroxyethyl methacrylate monomers. Preferably, the proportion by weight of polymethyl methacrylate is then substantially equal to 67%, the proportion by weight of poly(hydroxyethyl methacrylate) is substantially equal to 7% and the proportion by weight of poly(n-butyl acrylate) is substantially equal to 26%.

Preferably, it is a (poly(n-butyl acrylate)-co-poly(hydroxyethyl methacrylate)-b-polymethyl methacrylate) diblock copolymer.

Other amphiphilic block copolymers according to the invention are triblock copolymers:

hydrophobic block-b-poly(n-butyl acrylate)-co-poly(hydroxyethyl methacrylate)-b-polymethyl methacrylate, or poly(n-butyl acrylate)-co-poly(hydroxyethyl methacrylate)-b-polymethyl methacrylate-b-hydrophilic block. Preferably, this hydrophilic block essentially comprises (meth)acrylic monomers.

The phase microseparation of the hydrophobic blocks (in particular of the PMMA block) and the hydrophilic blocks makes it possible in particular to confer advantageous permeability properties on the filtration membrane in the composition of which the copolymer according to the invention participates. This specific phase microseparation makes it possible to obtain a stable structure (by the compatibility of the PMMA block with, for example, a PVDF matrix participating in the composition of the membrane) and effective use of the hydrophilic block since this hydrophilic block will become segregated from the PVDF matrix and become localized on the walls of the pores of the filtration membrane. This will generate a hydrophilic surface internal to the pores which will make it possible to increase the flow rate of water to be filtered and thus the permeability of the membrane.

The amphiphilic block copolymer in accordance with the invention can exhibit a weight-average molecular weight of between 10 kg/mol and 400 kg/mol, preferably between 15 and 100 kg/mol, and a number-average molecular weight of between 7 and 50 kg/mol. Its polydispersity index is preferably between 1.5 and 5.

According to a particularly preferred characteristic of the invention, the first hydrophilic block and/or the second hydrophobic block, preferably both blocks, are obtainable by a controlled radical polymerization (CRP) process, preferably by SFRP (Stable Free Radical Polymerization) polymerization, for example in the presence of at least one alkoxyamine, preferably a monoalkoxyamine of formula (I):

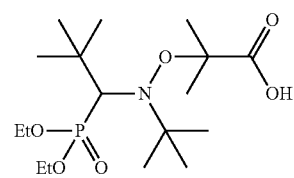

More generally, the synthesis of the blocks of the amphiphilic block copolymer of the invention can be carried out by any type of controlled radical polymerization at a temperature appropriate to the type of CRP chosen (according to whether it is SFRP, ATRP or RAFT) and to the chosen monomers of the copolymer.

Several types of controlled radical polymerization exist according to the nature of the control agent used:

the type using, as control agent, nitroxides and, for example, as initiator, alkoxyamines, known under the abbreviation SFRP (Stable Free Radical Polymerization);

the type using, as control agent, metal complexes and, for example, as initiator, halogenated compounds, known under the abbreviation ATRP (Atom Transfer Radical Polymerization);

the type using sulfur-comprising compounds, such as dithioesters, trithiocarbamates, xanthates or dithiocarbamates, known under the abbreviation RAFT (Reversible Addition Fragmentation Transfer).

Advantageously, the radical polymerization technique used is the SFRP polymerization, preferably carried out in the presence of at least one alkoxyamine, this type of compound providing both the role of initiating agent and of control agent.

Alkoxyamines advantageously used in the preparation of an amphiphilic block copolymer according to the invention can be chosen from the monoalkoxyamines of formula (II):

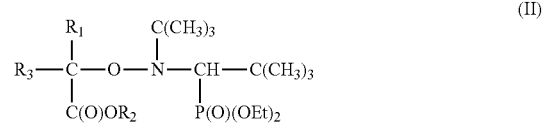

in which:

$R_1$ and $R_3$, which are identical or different, represent a linear or branched alkyl group having a number of carbon atoms ranging from 1 to 3;

$R_2$ represents a hydrogen atom, an alkali metal, such as Li, Na or K, an ammonium ion, such as $NH_4^+$, $NBu_4^+$ or $NHBu_3^+$; a linear or branched alkyl group having a number of carbon atoms ranging from 1 to 8, or a phenyl group.

A specific example of such a monoalkoxyamine which is particularly preferred in the context of the invention is that corresponding to the above formula (I). It is sold by Arkema under the trade name BlocBuilder® MA.

Other alkoxyamines which can be used in the preparation of amphiphilic block copolymers according to the invention are polyalkoxyamines resulting from a process which consists in reacting one or more alkoxyamines of formula (II) above with at least one polyunsaturated compound of formula (III):

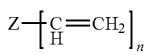
(III)

in which Z represents an aryl group or a group of formula Z1-[X—C(O)]$_n$, in which Z1 represents a polyfunctional structure originating, for example, from a compound of polyol type, X is an oxygen atom, a nitrogen atom carrying a carbon-comprising group or an oxygen atom, or a sulfur atom, and n is an integer greater than or equal to 2, in the presence or absence of solvent(s) preferably chosen from alcohols, such as ethanol, aromatic solvents, chlorinated solvents, ethers and polar aprotic solvents, at a temperature generally ranging from 0 to 90° C., preferably from 25 to 80° C., the molar ratio of monoalkoxyamine(s) of formula (II) to polyunsaturated compound(s) of formula (III) ranging from 1.5 to 1.5 n, preferably from n to 1.25 n, this stage optionally being followed by a stage of evaporation of the optional solvent(s).

The polyunsaturated compound of formula (III) can be chosen from polyfunctional vinylbenzenes (Z then being an aryl group) or from polyfunctional acrylic derivatives (Z then being a group of formula Z1-[X—C(O)]$_n$). Preferably, the polyunsaturated compound is divinylbenzene, trivinylbenzene, ethylene glycol diacrylate, 1,3-butanediol diacrylate, 1,4-butanediol diacrylate, 1,6-hexanediol diacrylate, neopentyl glycol diacrylate, cyclohexanedimethanol diacrylate, diethylene glycol diacrylate, triethylene glycol diacrylate, tetraethylene glycol diacrylate, dipropylene glycol diacrylate, tripropylene glycol diacrylate, polyethylene glycol diacrylates (sold by Sartomer under the names SR259, SR344 and SR610), hexanediol alkoxylate diacrylates (sold by Sartomer under the names CD561, CD565 and CD560), bisphenol A diacrylate, bisphenol A ethoxylate diacrylates (sold by Sartomer under the names SR349, SR601, SR602 and CD9038), trimethylolpropane triacrylate, pentaerythritol triacrylate, tris(2-hydroxyethyl)isocyanurate ethoxylate triacrylates (sold by Sartomer under the names SR454, SR499, SR502, SR9035 and SR415), glyceryl propoxylate triacrylate (sold by Sartomer under the name SR9020), trimethylolpropane propoxylate triacrylates (sold by Sartomer under the names SR492 and CD501), pentaerythritol tetraacrylate, ditrimethylolpropane tetraacrylate, pentaerythritol ethoxylate tetraacrylate (sold by Sartomer under the name SR494), dipentaerythritol pentaacrylate, caprolactones-modified dipentaerythritol hexaacrylates (sold by Sartomer under the names Kayarad DCPA20 and DCPA60) or dipentaerythritol polyacrylate (sold by UCB Chemicals under the name DPHPA).

The polyalkoxyamines thus produced correspond to the following formula (IV):

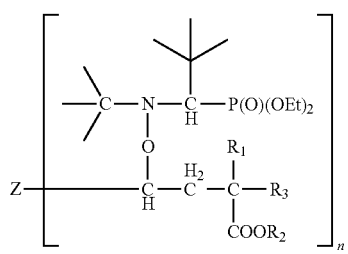
(IV)

in which n, R$_1$, R$_2$ and R$_3$, and Z have the same meanings as those given above.

A specific example of polyalkoxyamine in accordance with the general definition given above is the polyalkoxyamine corresponding to the following formula:

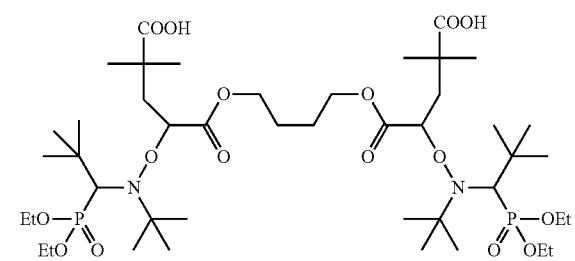 [SMILES: CCOP(=O)(OCC)C(N(OC(CC(C)(C)C(=O)O)C(=O)OCCCCOC(=O)C(CC(C)(C)C(=O)O)ON(C(C(C)(C)C)P(=O)(OCC)OCC)C(C)(C)C)C(C)(C)C)C(C)(C)C]

The alkoxyamine or polyalkoxyamine can be introduced into the polymerization medium in a proportion of 0.01 to 10%, preferably 0.1 to 5%, by weight, with respect to the weight of monomer(s) participating in the composition of the amphiphilic block copolymer according to the invention.

The polymerization stage for producing the blocks is carried out at a temperature appropriate to the type of monomers participating in the composition of the block. The polymerization temperatures depend on the constituent monomers of the block. Thus, in order to initiate the polymerization of the acrylate monomers and methacrylate monomers starting from alkoxyamines as defined above, a temperature of greater than 50° C., preferably of less than 130° C., preferably between 90° C. and 125° C., will advantageously be chosen.

The degree of conversion of the constituent monomers or mixture of monomers of the blocks generally depends on the manufacturing time devoted to the block and is generally set so as to obtain a block having a predetermined number-average molar mass.

Between two stages of preparation of two adjacent blocks and after the stage of preparation of the final block (that is to say, the end block), there may in particular be provided a stage of polymerization of the residual constituent monomer(s) of the block which has just been synthesized. This polymerization is generally carried out by conventional radical polymerization, by addition, to the medium in which the block has just been prepared, of a conventional radical polymerization initiator that is generally chosen from peroxide compounds (such as a peroxide compound of the Luperox® range, persulfate compounds (such as sodium persulfate, potassium persulfate or ammonium persulfate), azo compounds (such as azobisisobutyronitrile, called AiBN, 2,2'-azobis(2-amidinopropane) dihydrochloride and the metal and ammonium salts of 4,4'-azobis(4-cyanopentanoic acid)) or redox compounds (such as the persulfate (sodium, potassium or ammonium)/vitamin C pair, the sodium or potassium persulfate/metabisulfite pair, the aqueous hydrogen oxide solution/salts of the ferrous ion pair, the tert-butyl hydroperoxide/sodium sulfoxylate pair and any other possible oxidizing agent(s)/reducing agent(s) combination). The polymerization temperature of this stage is preferably chosen so as to be lower by at least 20° C. than the polymerization temperature of the block which has just been polymerized. The fact of decreasing the temperature makes it possible to retain the block previously synthesized in the living polymer form, without, however, continuing the polymerization of the latter.

The amphiphilic block copolymer according to the invention has applications in many fields.

In particular, the present invention relates to the use of this amphiphilic block copolymer, corresponding to one or more of the above characteristics, as additive in the manufacture of a polymer filtration membrane, in particular a polymer microfiltration or ultrafiltration membrane, especially by the phase inversion technique, which will be described in detailed fashion below in the present description.

According to another aspect, the present invention relates to a polymer membrane, in particular a polymer microfiltration or ultrafiltration membrane, which comprises a hydrophobic polymer matrix and an amphiphilic block copolymer corresponding to one or more of the characteristics set out above.

In specific embodiments of the invention, the hydrophobic polymer matrix comprises a fluoropolymer, preferably a polyvinylidene fluoride (PVDF) homopolymer. This homopolymer preferably exhibits a molar mass of between $10^5$ and $10^7$ g/mol.

In specific embodiments of the invention, the membrane comprises from 60 to 90% by weight of the hydrophobic polymer matrix and from 40 to 10% by weight of the amphiphilic block copolymer.

The size of the pores of the microfiltration or ultrafiltration membrane thus manufactured can vary between 1 nm and 1 μm.

This membrane can exhibit any geometry, for example flat, spiral, tubular, or hollow fibers.

The polymer membrane according to the invention can be obtained by a phase inversion process, carried out in a way conventional in itself, starting from a solution, referred to as collodion, comprising the hydrophobic polymer matrix, an amphiphilic block copolymer in accordance with the invention and, if appropriate, one or more other additives, in solution in a solvent.

In specific embodiments of such a phase inversion process, said solution comprises the following proportions by weight:

from 10 to 40% of the hydrophobic polymer matrix, in particular PVDF;

from 0.1 to 30%, preferably 3 to 15%, by weight of an amphiphilic block copolymer in accordance with the invention;

from 40 to 90% of solvent;

if appropriate, from 0 to 20% by weight of other additive(s).

The solvent can in particular be chosen from: dimethylacetamide (DMAc), N-methylpyrrolidone (NMP), dimethylformamide (DMF), dimethyl sulfone (DMSO$_2$), dimethyl sulfoxide (DMSO), trialkyl phosphate, tetrahydrofuran (THF), acetone, benzaldehyde, acetophenone, benzophenone, hexamethylphosphoramide (HMPA), tetramethylurea (TMU), triethyl phosphate (TEP), trimethyl phosphate (TMP) or any other solvent which makes it possible to dissolve the hydrophobic polymer matrix and the amphiphilic block copolymer in accordance with the invention, or any combination of such solvents.

Among the additives, other than the amphiphilic block copolymer in accordance with the invention, which can be chosen in the context of the invention as a function of the expected characteristics of the membrane, mention may be made of:

conventional additives, such as poly(methyl methacrylate) (PMMA), poly(ethylene glycol) (PEG), polyvinylpyrrolidone (PVP) or inorganic salts, such as lithium chloride (LiCl), magnesium chloride (MgCl$_2$) or zinc chloride (ZnCl$_2$);

nonsolvents for the hydrophobic polymer matrix, such as water, ethanol or methanol, or combinations of these nonsolvents;

oligomers, polymers, surfactants and/or copolymers different, but of the same family, than the amphiphilic block copolymer in accordance with the invention;

additives of metal and/or ceramic (nano)particle type, and also carbon nanotubes.

For the implementation of the final stage of the phase inversion process, in which the shaped collodion is brought into contact with a coagulation solution and a nonsolvent for the hydrophobic polymer matrix, this nonsolvent, which can be in the liquid form, in the vapor form or in a successively vapor and then liquid form, can be of any type conventional in itself, in particular water, methanol, ethanol, and the like. In addition, the coagulation solution can comprise one or more solvents for the hydrophobic polymer matrix, preferably identical to those present in the collodion, for example NMP, at a concentration by weight of between 0 and 50%, in particular between 0 and 10%, and one or more additives, such as LiCl or PEG.

The actual phase inversion can otherwise be carried out by heat treatment, so as coagulate the initial solution, by decreasing the temperature or, for some systems, by increasing the temperature.

The operating parameters for the phase inversion processes are conventional in themselves and are described, for example, in the publications by Penga et al., 2012; McKelvey et al., 1997; Mulder, 1996 and Porter, 1990.

By way of example, the temperature of the collodion can in particular be between 10 and 130° C., more particularly between 50 and 80° C.; the temperature of the coagulation bath can in particular be between 10 and 70° C., more particularly between 30 and 50° C.

The stage of shaping the collodion can be carried out by any means conventional in itself, for example, for the manufacture of hollow fibers, by an extrusion die, at a flow rate which can be between 0.1 and 72 ml/min, more particularly between 7 and 11 ml/min.

In specific embodiments of the polymer membrane in which the latter is shaped so as to constitute the body of hollow fibers, the phase inversion process additionally provides, in a way conventional in itself, for the use of an "internal liquid" solution which makes it possible to form the internal volume of the hollow fibers. This internal liquid preferably comprises a nonsolvent for the hydrophobic polymer matrix, such as water, methanol, ethanol, and the like, and, if appropriate, one or more solvents for the hydrophobic polymer matrix, preferably identical to those present in the collodion, for example NMP at a concentration by weight of between 0 and 100%, in particular between 15 and 30%, and one or more additives, such as LiCl or PEG. Its temperature can be between 20 and 90° C., in particular between 30 and 50° C. Its extrusion flow rate can be between 0.1 and 18 ml/min, more particularly between 1 and 5 ml/min.

According to another aspect, the present invention relates to the use of a polymer membrane corresponding to one or more of the above characteristics in the treatment of effluents, in particular of water.

The characteristics and advantages of the invention will become more clearly apparent in the light of the implementational examples below, provided simply by way of illustration and without in any way limiting the invention, with the support of FIGS. 1 to 4, in which.

Figure 4:
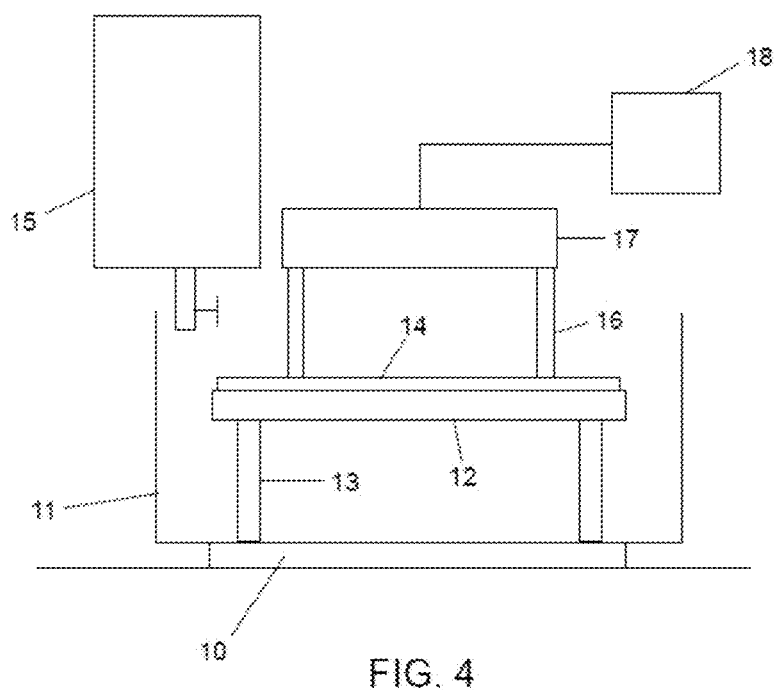

and FIG. 4 diagrammatically represents a device employed for evaluating the rate of coagulation of a collodion comprising an amphiphilic block copolymer in accordance with the invention.

EXAMPLE 1

Synthesis of an Amphiphilic Bock Copolymer in Accordance with the Invention

As example of the invention, there is prepared a polymer material comprising a poly(n-butyl acrylate)-co-poly(hydroxyethyl methacrylate)-b-polymethyl methacrylate-co-poly(butyl acrylate)-co-poly(hydroxyethyl methacrylate) diblock copolymer.

The process of the preparation of this polymer material can be applied to bulk, solvent, emulsion or suspension polymerization modes. Each stage of the process can be carried out in the same reactor via a batch process, or in different reactors optionally according to semicontinuous or continuous processes.

The polymer materials prepared according to the example set out below are respectively analyzed by:

$^1$H NMR in deuterated chloroform on a Brucker 400 device;

steric exclusion chromatography carried out at 30° C. using a polystyrene standard as reference in order to measure the number-average molecular weights.

1.1/Initiator of Alkoxyamine Type

The initiator and control agent of the monoalkoxyamine type of the following formula (I):

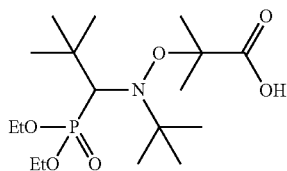

(I)

is used.

This initiator is sold by Arkema under the trade name BlocBuilder® MA.

1.2/Stage 1—Preparation of a First Hydrophilic Block

A first living hydrophilic block of poly(n-butyl acrylate) copolymerized with poly(hydroxyethyl methacrylate) is prepared, which block will be used in the preparation of the amphiphilic block copolymer in accordance with the invention.

The protocol for the preparation of this first living block is as follows.

12 kg of n-butyl acrylate and also 3 kg of hydroxyethyl methacrylate and 544 g of the initiator BlocBuilder® MA defined above are introduced, at ambient temperature, into a 16 liter jacketed stainless steel reactor equipped with a decompression valve tared at 10 bar and with a stirrer of the "double screw propeller" type. The mixture is vented and maintained under an atmosphere of 3 bar of nitrogen and then heated until a temperature of 110° C. is reached. The exothermicity of the polymerization reaction is countered by virtue of the heat exchanger comprising an aqueous glycol solution at −25° C. The mixture is heated for 450 minutes until the polymerization reaction is complete. The solids content, measured by a thermobalance, is 78%.

The mixture is subsequently cooled to ambient temperature over 15 minutes, so as to quench the reaction mixture. A solution of polymer in n-butyl acrylate and hydroxyethyl methacrylate is recovered via a bottom valve.

A measurement of solids content indicates that there has been a conversion of 77%, that is to say that 77% of the n-butyl acrylate and hydroxyethyl methacrylate present in the initial mixture have polymerized.

The intermediate n-butyl acrylate and hydroxyethyl methacrylate polymer is characterized by steric exclusion chromatography and by NMR, which provide the following data:

Number-average molecular weight Mn=6620 g/mol;
Weight-average molecular weight Mw=17 730 g/mol;
Polydispersity index Ip=2.7;
Composition by weight: 56.2% of poly(butyl acrylate), 23.1% of n-butyl acrylate, 20.4% of poly(hydroxyethyl methacrylate) and 0.3% of hydroxyethyl methacrylate.

This solution of polymers is used as is in stage 2 below.

1.3/Stage 2—Preparation of the Diblock Copolymer

The amphiphilic diblock copolymer is prepared by controlled radical polymerization according to a method conventional in itself.

The preparation protocol is as follows.

After cleaning with toluene, the same reactor as in stage 1 is charged with 3.2 kg of the solution obtained in stage 1 and 6.8 kg of methyl methacrylate, the initial mixture thus comprising 2.5 kg of living poly(butyl acrylate) and poly(hydroxyethyl methacrylate), 0.7 kg of residual n-butyl acrylate, 10 g of residual hydroxyethyl methacrylate and 6.8 kg of methyl methacrylate. The combined mixture is diluted with 4.9 kg of toluene.

After placing under nitrogen, the reactor is heated up to 105° C. for 90 minutes and then at 120° C. for 90 minutes before being cooled in 15 minutes to 50° C.

The intermediate conversion is then 66%. 52.8 g of Luperox® 270 added to 146 g of diluting toluene are then added to the reaction medium.

The mixture is vented, placed under nitrogen, stirred and then heated up to 120° C. for 150 minutes. The final mixture exhibits a solids content of 95%. It is subsequently transferred through a heated transfer line at 70° C. into a Clextral BC21 venting extruder having 5 venting wells and 12 heating regions, ranging from 70° C. at the inlet of the extruder up to 180° C. at the die of "rod" type. The molten block copolymer is subsequently cooled in a water tank and then granulated.

This copolymer exhibits the following characteristics:
Number-average molecular weight Mn=16 030 g/mol;
Weight-average molecular weight Mw=53 070 g/mol;
Polydispersity index Ip=3.3.

The chemical composition of the copolymer is determined by $^1$H NMR and gives the following results:
polymethyl methacrylate: 66.6% (by weight);
poly(n-butyl acrylate): 25.4% (by weight);

poly(hydroxyethyl methacrylate): 6.9% (by weight);
methyl methacrylate<0.3% (by weight);
n-butyl acrylate<0.8% (by weight);
hydroxyethyl methacrylate<detection limit
toluene<0.5% (by weight).

EXAMPLE 2

Flat Polymer Membranes Based on PVDF and on an Amphiphilic Block Copolymer in Accordance with the Invention 2.1/Manufacture A flat polymer membrane P1 in accordance with the present invention is manufactured from a collodion comprising:
- 15% by weight of PVDF, commercial grade, of a molar mass of between 900 000 and 1 100 000 g/mol (HSV 900, Arkema Inc., USA)
- 10% by weight of the amphiphilic block copolymer of example 1
- 75% by weight of NMP.

A film cast from this collodion is successively immersed in two water baths, named bath 1 and bath 2.

The experimental conditions are as follows:
temperature of the collodion: 25.3° C.
temperature of the baths: 22.5° C.
temperature of the ambient air: 25.3° C.
relative humidity of the ambient air: 74.6%
immersion time in bath 1: 22 min
volume of bath 1: 5 l
immersion time in bath 2: 24 h
volume of bath 2: 5 l A flat porous polymer membrane with a thickness of 220 μm is obtained.

Figure 1:
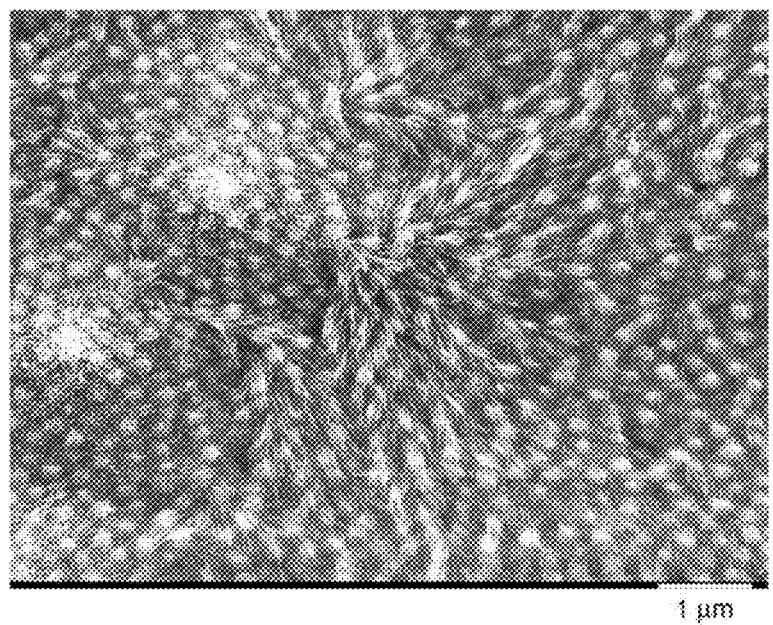
FIG. 1 represents a scanning electron microscopy (SEM) photograph of a flat polymer membrane in accordance with the invention.

A photograph of the filtering surface of this membrane obtained by scanning electron microscopy (SEM) is shown in FIG. 1. It is observed therein that the membrane exhibits a surface appearance and a surface condition which are different from those observed for conventional membranes made of PVDF. More particularly, it is observed that the membrane exhibits a wire surface structure which is initiated at the crystalline nodules of the PVDF. A surface hydrophilization is observed.

Figure 2:
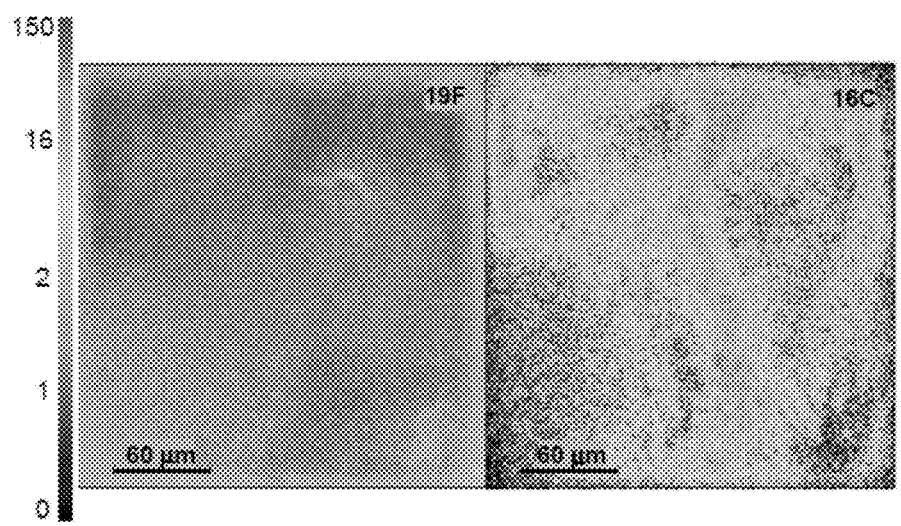
FIG. 2 shows images obtained by SIMS imaging of the macropores of the membrane of FIG. 1, from a beam of primary ions, left-hand image fluorine ("19F"), right-hand image oxygen ("16O")

The modifications brought about by the copolymer in accordance with the invention are also observable at the macropores of the membrane, as shown in the images of FIG. 2, obtained by imaging by emission of secondary ions (SIMS), which testify to an enriching in copolymer on the walls of the pores. This results in a hydrophilization of these walls, which has the effect of improving the flow and surface properties of the membrane.

Other flat polymer membranes in accordance with the invention, named P2 and P3, are manufactured in a similar way from collodions respectively comprising 3% and 7% by weight of the amphiphilic block copolymer of example 1 and 15% by weight of PVDF in NMP.

2.2/Resistance to Aging

In order to determine the capability of resistance to aging of the membrane P1, the latter was brought into contact with a dose of 750 000 ppm·h of NaOCl at pH 8. This dose represents three times the total dose which a filtration membrane is conventionally subjected to throughout its duration of use. The instantaneous concentration, of 1 000 ppm of free chlorine, is greater than the maximum dose generally recommended by the manufacturers for commercial filtration membranes.

A membrane P1 was also subjected to a dose of 168 000 ppm·h of NaOCl at pH 8.

Surprisingly, no impact of the treatments by NaOCl on the quality of the surface of the membrane or on the amount of copolymer present at the surface of the membrane is observed. In particular, the surface hydrophilicity and the FTIR signals are not modified, indicating an unvarying presence of the copolymer at the surface of the membrane.

The permeability of the membrane, before and after a dose of 750 000 ppm·h of NaOCl, and the relative permeability after immersing in a solution of real water (surface water withdrawn from the Canal du Midi, at Toulouse), before and after a dose of 168 000 ppm·h of NaOCl, of the membrane P1 are measured. The permeability, to pure water, is measured using an Amicon® 8050 cell. The pressure is set at 0.3 and 0.7 bar, while the permeate flow rate is measured for these two pressures. The permeability is calculated by dividing the flow rate by the filtering surface area and the transmembrane pressure. The mean value of the permeability is given.

The results obtained are shown in table 1 below.

TABLE 1

Permeability properties of the membrane P1 before and after contact with NaOCl

| | Before NaOCl | After NaOCl |
|---|---|---|
| Permeability ($l \cdot h^{-1} \cdot m^{-2} \cdot bar^{-1}$) at 20° C. | $Lp_0 = 90 \pm 5$ | $Lp = 87 \pm 4$ |
| Ratio of the permeability to water after immersing in real water to the permeability to water before immersing ($Lp/Lp_0$) | $0.76 \pm 0.04$ | $0.79 \pm 0.05$ |

The permeability of the membrane is not detrimentally affected by the nevertheless very high dose of NaOCl employed.

Figure 3:
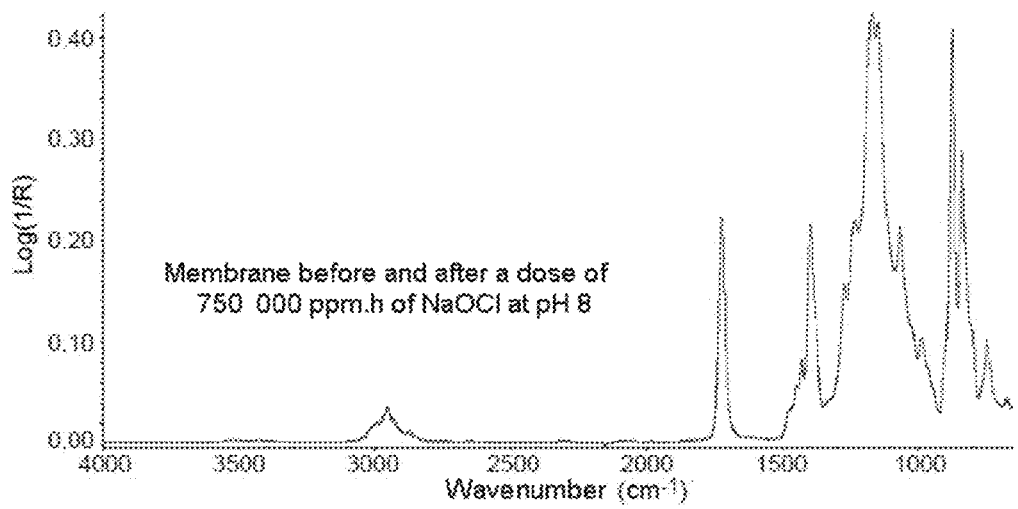
FIG. 3 shows the Fourier transform infrared (FTIR) spectra of the membrane of FIG. 1 before and after bringing into contact with a dose of 750 000 ppm·h of NaOCl at pH 8.

The spectra obtained by Fourier transform infrared spectroscopy (FTIR) for the membrane P1, respectively before and after contact with a dose of 750 000 ppm·h of NaOCl, are shown in FIG. 3. No change in signal is observed therein as a result of the treatment with NaOCl. In particular, the peak relating to the copolymer, located at 1725 $cm^{-1}$, does not change in intensity.

The above results demonstrate the particularly high capability of chemical resistance of the membrane in accordance with the invention with regard to chlorinated solutions, in contrast to what is observed for the membranes employing conventional additives, such as PVP.

The membranes P2 and P3 in accordance with the invention were also subjected to doses of NaOCl at pH 8.

The permeability of each membrane, before and after a dose of 750 000 ppm·h of NaOCl at pH 8, and relative permeability after immersing in a solution of real water, before and after a dose of 168 000 ppm·h at pH 8 of NaOCl, of each of the membranes P2 and P3 are measured. FTIR spectra are also recorded respectively before and after contact with a dose of 750 000 ppm·h at pH 8 of NaOCl. The results of these tests are shown in table 2 below.

TABLE 2

Permeability and FTIR signal at 1725 cm$^{-1}$ properties for the membranes P2 and P3 before and after contact with NaOCl

|  | Membrane P2 (3% copolymer) | | Membrane P3 (7% copolymer) | |
| --- | --- | --- | --- | --- |
|  | Before NaOCl | After NaOCl | Before NaOCl | After NaOCl |
| Permeability (l · h$^{-1}$ · m$^{-2}$ · bar$^{-1}$) at 20° C. | Lp$_0$ = 422 ± 21 | Lp = 412 ± 21 | Lp$_0$ = 112 ± 6 | Lp = 108 ± 5 |
| Ratio of the permeability to water after immersing in real water to the permeability to water before immersing (Lp/Lp$_0$) | 0.73 ± 0.04 | 0.71 ± 0.03 | 0.76 ± 0.05 | 0.71 ± 0.06 |
| Relative intensity of the FTIR signal at 1725 cm$^{-1}$ | 0.21 ± 0.01 | 0.20 ± 0.01 | 0.4 ± 0.02 | 0.38 ± 0.02 |

Here again, no significant variation in these parameters due to the treatment with NaOCl is observed.

EXAMPLE 3

Polymer Membrane of Hollow Fiber Type Based on PVDF and on an Amphiphilic Block Copolymer in Accordance with the Invention 2.1/Manufacture A polymer membrane of hollow fiber type F1 in accordance with the present invention is manufactured from a collodion comprising:
15% by weight of PVDF, commercial grade, with a molar mass of between 900 000 and 1 100 000 g/mol (HSV 900, Arkema Inc., USA)
3% by weight of the amphiphilic block copolymer of example 1
3% by weight of lithium chloride (LiCl)
79% by weight of NMP.

The experimental manufacturing conditions are as follows: dissolution, with mechanical stirring using a Teflon three-bladed stirrer, of the copolymer in NMP for 24 h, by heating with a water bath at 50° C., with condensation of the solvent vapors; then the addition of PVDF and dissolution at 57° C. for a further 24 h; placing the collodion under vacuum (by means of a vacuum pump) for venting for 24 h; manufacture of a hollow fiber by extrusion of the collodion through an annular die.

The spinning conditions are as follows:
collodion flow rate: 7.2 cm$^3$·min$^{-1}$
internal liquid flow rate: 2.7 cm$^3$·min$^{-1}$
T° of the collodion=T° of the internal liquid=50° C.
T° of the coagulation bath=32° C.
internal liquid: water/NMP 85%/15% by weight
air gap: 10 cm
spinning rate: 11 m·min$^{-1}$ 2.2/Resistance to Aging In order to determine the capability of resistance to aging of the membrane F1, the latter was brought into contact with a dose of 1 350 000 ppm·h of NaOCl at pH 8.

The permeability of the membrane and its relative permeability after immersing in a solution of real water, before and after the dose of NaOCl, are measured.

FTIR spectra are also recorded respectively before and after contact with a dose of 1 350 000 ppm·h of NaOCl.

The mechanical strength of the membrane is tested by longitudinal tensile tests at an unvarying rate of movement of the upper jaw of 200 mm/min, using a tensile testing machine of Instron® type, before and after the dose of NaOCl.

Finally, the SIMS signals are registered before and after a dose of 600 000 ppm·h of NaOCl.

The results of these tests are shown in table 3 below.

TABLE 3

Permeability, mechanical strength, FTIR signal at 1725 cm$^{-1}$ and SIMS signal properties for the membrane F1 before and after contact with NaOCl

|  | Before NaOCl | After NaOCl |
| --- | --- | --- |
| Permeability (l · h$^{-1}$ · m$^{-2}$ · bar$^{-1}$) at 20° C. | Lp$_0$ = 198 ± 10 | Lp = 189 ± 10 |
| Ratio of the permeability to water after immersing in real water to the permeability to water before immersing (Lp/Lp$_0$) | 0.73 ± 0.04 | 0.71 ± 0.03 |
| Breaking force (N) | 1.61 ± 0.03 | 1.63 ± 0.04 |
| Relative intensity of the FTIR signal at 1725 cm$^{-1}$ | 0.21 ± 0.01 | 0.20 ± 0.01 |
| SIMS signals of the copolymer (signal relating to oxygen/fluorine × 10$^{-4}$) | 3.64 ± 2 | 5.20 ± 3 |

For none of these parameters is a significant variation due to the treatment with NaOCl observed. This demonstrates the high capability of resistance to aging of the membrane in accordance with the invention.

EXAMPLE 4

Effect of an Amphiphilic Block Copolymer in Accordance with the Invention on the Rate of Coagulation 4.1/Equipment and Measurement Method In order to evaluate the effect of the amphiphilic block copolymer in accordance with the invention on the rate of coagulation of the collodion in the manufacture of a porous polymer membrane by a phase inversion process, a device as represented diagrammatically in FIG. 4 is used.

This measurement device comprises an extended white light source 10. The latter is surmounted by a coagulation crystallizing dish 11 with a capacity of 2 l made of optically transparent Pyrex® glass. A circular coagulation plate 12, also made of Pyrex® glass and optically transparent, is used to receive the collodion. This plate 12 is placed on 4 feet 13 in order to be maintained at a height of 5 cm from the light source 10.

The collodion to be analyzed 14 is spread homogeneously over the coagulation plate 12 using a stainless steel knife.

A reservoir 15 containing the nonsolvent, more particularly water, used to bring about the coagulation of the collodion is positioned above the crystallizing dish 11.

A means 16 for holding the membrane on the coagulation plate 12, as it is formed, is placed on the collodion 14. A means for acquisition of photographs 17 rests on the holding means 16, so as to ensure that the membrane is held better in place, more particularly by preventing any detachment of the membrane from the coagulation plate 12 during coagulation.

A system 18 for compilation and processing of the data resulting from the acquisition means 17 completes the device.

All the constituent components above of the measurement device are placed in a closed case in order to eliminate any sources of light other than that coming from the extended white light source 10.

All the components described above, which are constituents of the measurement device, are conventional in themselves.

The images acquired during the coagulation of the collodion, under the effect of contact with the nonsolvent poured onto the collodion, are compiled and processed by the data processing system 18. The images are calibrated and standardized in order to obtain data comparable between the different collodions. The accuracy with regard to time of the measurements carried out is less than or equal to 1 s. Repeatability measurements have shown the consistency of the values measured.

4.2/Collodions Studied

The collodions produced and studied are listed in table 4 below. Among these collodions, the collodions Comp.1 to Comp. 8 are comparative collodions not employing the amphiphilic block copolymer in accordance with the invention; the collodions C1 to C3 employ the amphiphilic block copolymer in accordance with the invention of example 1 (Copol.).

TABLE 4

Compositions of the collodions studied

| Collodion | Polymer matrix (% by weight) | Additive (% by weight) | Solvent (% by weight) |
|---|---|---|---|
| Comp. 1 | PVDF HSV 900 (15) | — | NMP (85) |
| Comp. 2 | PSF (18) | PVP K30 (15) | NMP (67) |
| Comp. 3 | CTA (15) | — | NMP (85) |
| Comp. 4 | PVDF HSV 900 (15) | LiCl (3) | NMP (82) |
| Comp. 5 | PVDF HSV 900 (15) | PVP K10 (3) | NMP (82) |
| Comp. 6 | PVDF HSV 900 (15) | PVP K30 (3) | NMP (82) |
| Comp. 7 | PVDF HSV 900 (15) | PMMA (3) | NMP (82) |
| Comp. 8 | PVDF HSV 900 (15) | PEG 600 Da (3) | NMP (82) |
| C1 | PVDF HSV 900 (15) | Copol. (3) | NMP (82) |
| C2 | PVDF HSV 900 (15) | Copol. (7) | NMP (78) |
| C3 | PVDF HSV 900 (15) | Copol. (10) | NMP (75) |

4.3/Results

The following results are obtained.

Entirely predictably, it is observed that the membrane Comp. 2 based on polysulfone (PSF) begins to coagulate very soon (induction time of 2 s) and coagulates very rapidly (rate 1300 times greater than the membrane Comp. 1 based on PVDF). The membrane Comp. 3 based on cellulose triacetate (CTA) begins to coagulate two times sooner than the membrane Comp. 1 (2130 s versus 4060 s) and its rate of coagulation is similar.

The addition of an additive, such as PEG, at a level of 3% by weight (Comp. 8) increases the induction time and very slightly decreases the rate of coagulation of the collodion based on PVDF. LiCl (Comp. 4) and PVP (Comp. 5 and Comp. 6) decrease the induction time by 40% and increase the rate of coagulation by 40%.

The incorporation of PMMA in the collodion (Comp. 7) very markedly advances the start of the coagulation, which takes place approximately 4 times sooner than for the additive-free collodion Comp. 1.

The rates of coagulation of the collodions in accordance with the invention C1 to C3 are markedly greater than that of Comp. 1. A decrease in the induction time of 600% and an increase in the rate of coagulation of 350% are found. In comparison with the collodions Comp. 4 to Comp. 8 comprising additives other than the amphiphilic block copolymer in accordance with the invention, the induction times are reduced by a factor of between 3.7 and 7.7. The rates of coagulation are increased by a factor from 2 to 4.5.

Additional tests have shown the addition of the amphiphilic block copolymer in accordance with the invention to collodions comprising other conventional additives also makes it possible to accelerate the coagulation. Thus, the addition of 3% by weight of the amphiphilic block copolymer in accordance with the invention to a collodion additionally comprising LiCl makes it possible to decrease the induction time by a factor of 4.1 and increase the rate of coagulation by a factor of 2.2.

In addition, the induction times are shorter in proportion and the rate of coagulation is greater in proportion as the concentration of amphiphilic block copolymer in accordance with the invention in the collodion increases.

BIBLIOGRAPHIC REFERENCES

Arkhangelsky et al., 2007, *J. Membr. Sci.*, 305, 176-184
Fontananova et al., 2006, *Desalination*, 192, 190-197
Hester et al., 1999, *Macromolecules*, 32, 1643-1650
McKelvey et al., 1997, *Journal of Membrane Science*, 124, 223-232
Mulder, 1996, Basic Principles of Membrane Technology ($2^{nd}$ ed.), Kluwer Academic Publishers, Dordrecht
Penga et al., 2012, *Progress in Polymer Science*, 37, 1401-1424
Porter, 1990, Handbook of Industrial Membrane Technology, Noyes Publications, New Jersey
Qin et al., 2002, *Desalination*, 146, 307-309
Rouaix et al., 2006, *J. Membr. Sci.*, 277, 137-147
Wienk et al., 1995, *J. Polym. Sci. A. Polym. Chem.*, 33, 49

The invention claimed is:

1. An amphiphilic block copolymer comprising at least a first hydrophilic block obtainable from n-butyl acrylate and hydroxyethyl methacrylate monomers and a second hydrophobic block obtainable from a methyl methacrylate monomer.

2. The copolymer as claimed in claim 1, consisting of a diblock copolymer.

3. The copolymer as claimed in claim 1, wherein said first hydrophilic block is essentially composed of a random copolymer comprising n-butyl acrylate and hydroxyethyl methacrylate monomers.

4. The copolymer as claimed in claim 1, wherein said second hydrophobic block is composed of at least 50% of polymethyl methacrylate, the remainder being formed of a mixture of methacrylate or acrylate monomers.

5. The copolymer as claimed in claim 4, wherein the remainder is formed of a mixture of n-butyl acrylate and hydroxyethyl methacrylate monomers.

6. The copolymer as claimed in claim 1, consisting of a (poly(n-butyl acrylate)-co-poly(hydroxyethyl methacrylate)-b-hydrophobic) block copolymer where the hydrophobic block is composed of at least 50% of polymethyl methacrylate, the remainder being formed of a mixture of methacrylate or acrylate monomers.

7. The copolymer as claimed in claim 6, wherein the remainder is formed of a mixture of n-butyl acrylate and hydroxyethyl methacrylate monomers.

8. The copolymer as claimed in claim 1, exhibiting a weight-average molecular weight of between 10 kg/mol and 400 kg/mol.

9. The copolymer as claimed in claim 1, wherein said first hydrophilic block and/or said second hydrophobic block is obtainable by a controlled radical polymerization process.

10. The copolymer as claimed in claim 9, obtainable by SFRP polymerization.

11. The copolymer as claimed in claim 10, wherein said first hydrophilic block and/or said second hydrophobic block is obtainable by SFRP polymerization in the presence of at least one alkoxyamine.

12. The copolymer as claimed in claim 11, wherein said first hydrophilic block and/or said second hydrophobic block is obtainable by SFRP polymerization in the presence of a monoalkoxyamine of formula (I):

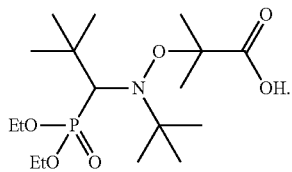

(I)

13. A method for manufacturing a polymer filtration membrane, comprising coagulating a collodion comprising a polymer matrix and an amphiphilic block copolymer as claimed in claim 1 as an additive.

14. A polymer membrane, comprising a hydrophobic polymer matrix and an amphiphilic block copolymer as claimed in claim 1.

15. The polymer membrane as claimed in claim 14, wherein the hydrophobic polymer matrix comprises a fluoro polymer.

16. The polymer membrane as claimed in claim 15, wherein said fluoro polymer is a polyvinylidene fluoride homopolymer.

17. The polymer membrane as claimed in claim 14, comprising from 60 to 90% by weight of said hydrophobic polymer matrix and from 10 to 40% by weight of said amphiphilic block copolymer.

18. The polymer membrane as claimed in claim 14, obtainable by a phase inversion process starting from a solution comprising said hydrophobic polymer matrix, said amphiphilic block copolymer and, if appropriate, one or more other additives, in solution in a solvent.

19. The polymer membrane as claimed in claim 18, obtainable by a phase inversion process from a solution comprising the following proportions by weight:
from 10 to 40% of said hydrophobic polymer matrix;
from 0.1 to 30% by weight of said amphiphilic block copolymer;
from 40 to 90% of solvent;
if appropriate, from 0 to 20% by weight of other additive(s).

20. The polymer membrane as claimed in claim 19, wherein said hydrophobic polymer matrix is PVDF.

21. A method of treating effluents, comprising filtering an effluent through a polymer membrane as claimed in claim 14.

22. The method as claimed in claim 21 wherein the effluent is water.

* * * * *